United States Patent [19]

Dent, Jr. et al.

[11] 4,049,412
[45] Sept. 20, 1977

[54] METHOD AND APPARATUS FOR FORMING GLASS FIBERS

[75] Inventors: Joseph B. Dent, Jr.; Walter L. Martin, Jr.; Howard M. Bennett, all of Lexington, N.C.

[73] Assignee: PPG Industries, Inc., Pittsburgh, Pa.

[21] Appl. No.: 707,986

[22] Filed: July 23, 1976

[51] Int. Cl.² ............................................. C03B 37/02
[52] U.S. Cl. ........................................ 65/2; 65/11 R; 165/11; 165/168
[58] Field of Search ............... 65/2, 11 R, 12, 355, 65/356; 165/47, 168, 11

[56] References Cited

U.S. PATENT DOCUMENTS

| | | | |
|---|---|---|---|
| 3,284,180 | 11/1966 | Stalego | 65/12 |
| 3,387,958 | 6/1968 | Day et al. | 65/355 X |
| 3,409,072 | 11/1968 | Stalego | 65/355 X |
| 3,440,685 | 4/1969 | Constantakis et al. | 65/355 X |
| 3,595,307 | 7/1971 | Mowatt-Larson et al. | 165/47 |
| 3,726,655 | 4/1973 | Mitcham et al. | 65/356 X |

Primary Examiner—Robert L. Lindsay, Jr.
Attorney, Agent, or Firm—Alan T. McDonald; John E. Curley

[57] ABSTRACT

An improved method and apparatus for forming glass fibers is disclosed. The environment below the bushing is controlled by a pair of manifolds through which a cooling fluid flows. This cooling fluid additionally is employed to cool the various apparatus surrounding the bushing. The cooling fluid enters the manifolds through a plurality of entrance connections and exits the manifolds through a plurality of exit connections. The exit connections are connected to the various elements of the bushing apparatus and allows cooling fluid to flow through these elements. The cooling fluid is then returned to the manifolds by a separate set of entrance connections, flows through the manifolds, and again exits the manifolds through another set of exit connections to return to the fluid circulation system. Such a cooling system provides cooling to the environment directly surrounding and below the bushing and a systematic cooling fluid connection of the various elements surrounding the bushing which must be cooled in a glass fiber forming operation and thus connected to their source of cooling fluid.

10 Claims, 4 Drawing Figures

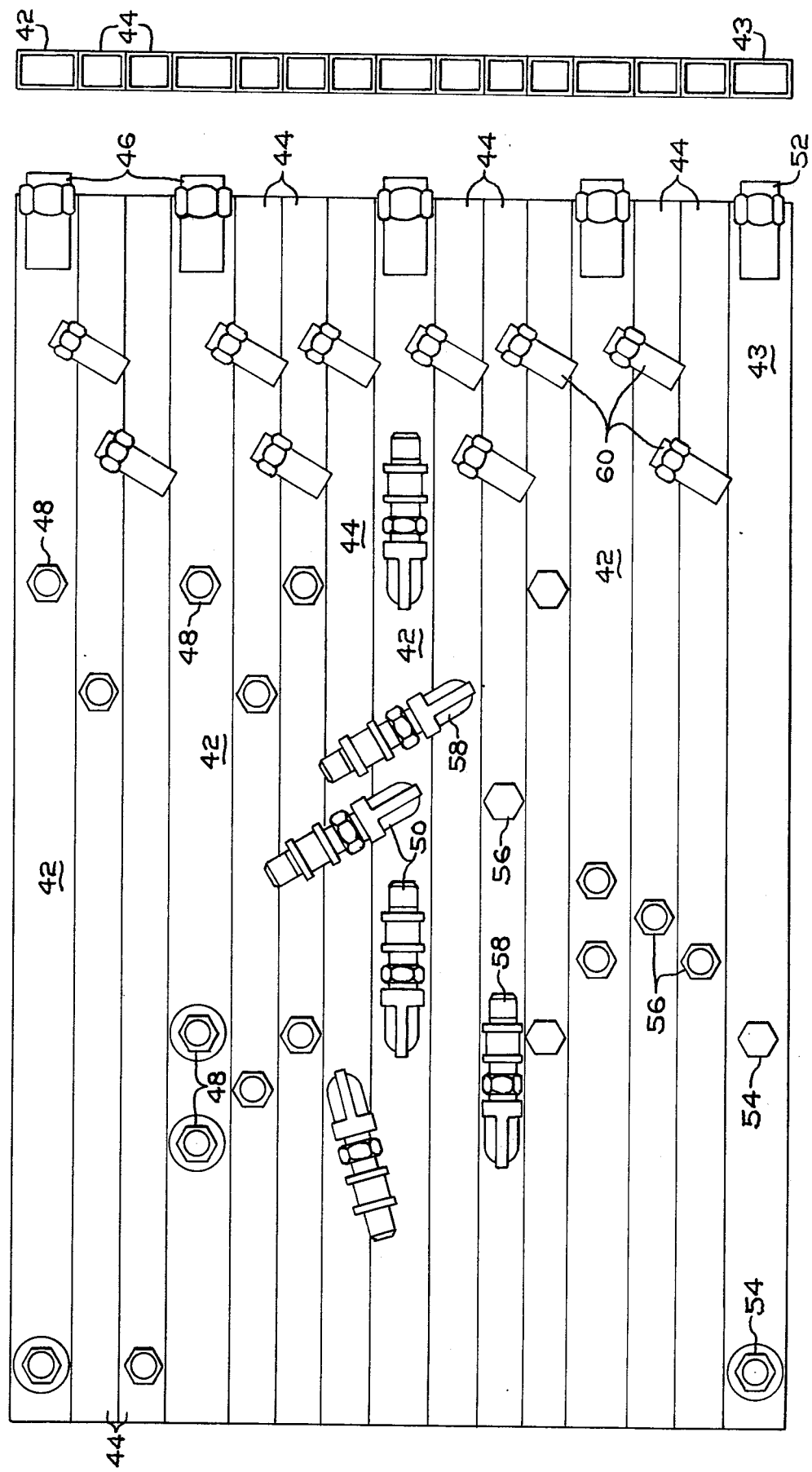

METHOD AND APPARATUS FOR FORMING GLASS FIBERS

BACKGROUND OF THE INVENTION

Glass fibers are typically formed by attenuating filaments through bushing tips at the bottom of a heated bushing containing molten glass. The filaments are then passed across the application surface of an applicator such as a belt, pad, or roller applicator or sprayed by a spray applicator where they are thus coated with a binder and/or size. The filaments are then gathered into a unified strand in a gathering shoe and may then be wound as a forming package, chopped into individual strands, and the like.

Temperatures of the heated bushing may reach 2,400° F (1315.6° C) and even more. This heat requires that various elements in the area of the bushing be cooled. These elements include the refractory surrounding the platinum or platinum-rhodium alloy bushing, the electrical connectors through which current is supplied to heat the bushing, and fin coolers located directly below the bushing. In addition, cooling fluid is supplied to cooling panels located in front of and behind the bushing.

In the past, cooling fluid for these elements has been supplied by individual hoses connected to each element. Each of these hoses was in turn connected to a source of the cooling fluid, typically to a recirculating water system. The plurality of inlet and outlet hoses connected to the elements around the bushing creates a crowded disarray. This presents noticeable problems. First, it is difficult for an operator to work in the region around the bushing due to the crowded situation caused by the multiplicity of hoses present. More importantly, airflow, which is highly important in the area around the bushing for the formation of uniform filaments, is restricted by the clutter caused by the hoses. A system for improving airflow in a filament forming region, including the employment of the cooling system of the present invention is more fully disclosed in concurrently filed U.S. application Ser. No. 707,985 by David M. Long and Joseph B. Dent, Jr., which is incorporated herein by reference. In addition, should a clogging of any of the vital cooling lines occur, it is difficult to determine which line is causing a problem, without completely tracing through the lines, since there has been little or no consistency in the placement of lines from forming position to forming position in the past.

It is therefore, desirable to reduce the amount of tubing or hose required beneath the bushing to reduce the clutter and allow greater ease of serviceability for the bushing and greater airflow, thus producing a high quality glass strand. In addition, it is desirable to provide a consistent location of the hoses employed for cooling from position to position to allow simple recognition should a problem occur and for ease of maintenance.

As previously mentioned, control of the environment around the bushing is vital to the production of high quality filaments. In the past, cooling panels have been employed in front of and behind the bushing to help maintain more uniform environment surrounding and below it. While these have been helpful, they have not completely solved the problem of uniform filament diameter formation. Part of this problem results from the fact that the area below the bushing is receiving cooling from in front of and behind the bushing but not from its sides. It is therefore, desirable to cool the region directly below the bushing from the sides to help maintain a more uniform temperature environment around the bushing.

THE PRESENT INVENTION

By means of the present invention, both of these desirable results are obtained.

According to one aspect of the present invention, a method of cooling both the elements of the bushing apparatus and the environment around the bushing is provided. Cooling fluid is passed through a pair of manifolds, one of which is located on each side of the bushing and below it. The fluid entering the manifolds is then passed through individual hoses to each of the elements which must be cooled. Return hoses are provided to flow the cooling fluid back into the cooling manifolds, through the manifolds, and to its recirculation system. The cooling fluid within the manifolds acts to help maintain a more uniform temperature environment around the bushing while the cooling fluid flowing in and out of the elements of the bushing apparatus acts to cool these elements. The manifolds are preferably designed and attached to the elements around the bushing such that an approximately equal amount of cooling results on both sides of the bushing from each manifold to maintain a more uniform temperature environment around the bushing. The hose connections are additionally located to minimize the amount of hose employed and thus allow for better airflow around the bushing.

According to a second aspect of the present invention, apparatus is provided which includes a pair of cooling manifolds located below the bushing, one on either side of the bushing. The manifolds are formed of a plurality of intake and outlet sections. Each intake section is connected to a source of cooling fluid at one end and to one or more of the elements of the bushing apparatus which must be cooled along its length. Each outlet section is connected to the elements which are to be cooled along its length and at its end to the return for the cooling fluid. Preferably, the outlet sections are each connected to only one of these elements to make identification of clogging problems simpler for the operator. Since each cooling element thus has a separate return line to the cooling fluid return, any element which is not receiving its cooling fluid is readily discernible. Further, it is most desirable that each forming position be set up identically or as near so as possible with the varied requirements of different forming operations so that the operator can readily determine which line has become clogged based solely upon his knowledge of which line is connected to what element for the various forming positions without a need to trace the lines.

The present method and apparatus thus provides the ability to maintain a more uniform temperature environment surrounding and below the bushing and to perform both the cooling functions around the bushing and the cooling functions for the elements of the bushing apparatus with a single cooling unit. At the same time the invention provides a more open region surrounding and below the bushing to allow for better airflow.

BRIEF DESCRIPTION OF THE DRAWINGS

The method and apparatus of the present invention will be more fully described with reference to the drawings in which:

FIG. 2 is a side elevational view of a cooling manifold as employed in the present invention;

FIG. 3 is a cross-sectional view of the manifold as shown in FIG. 2; and

DETAILED DESCRIPTION OF THE PREFERRED EMBODIMENT

Figure 1:
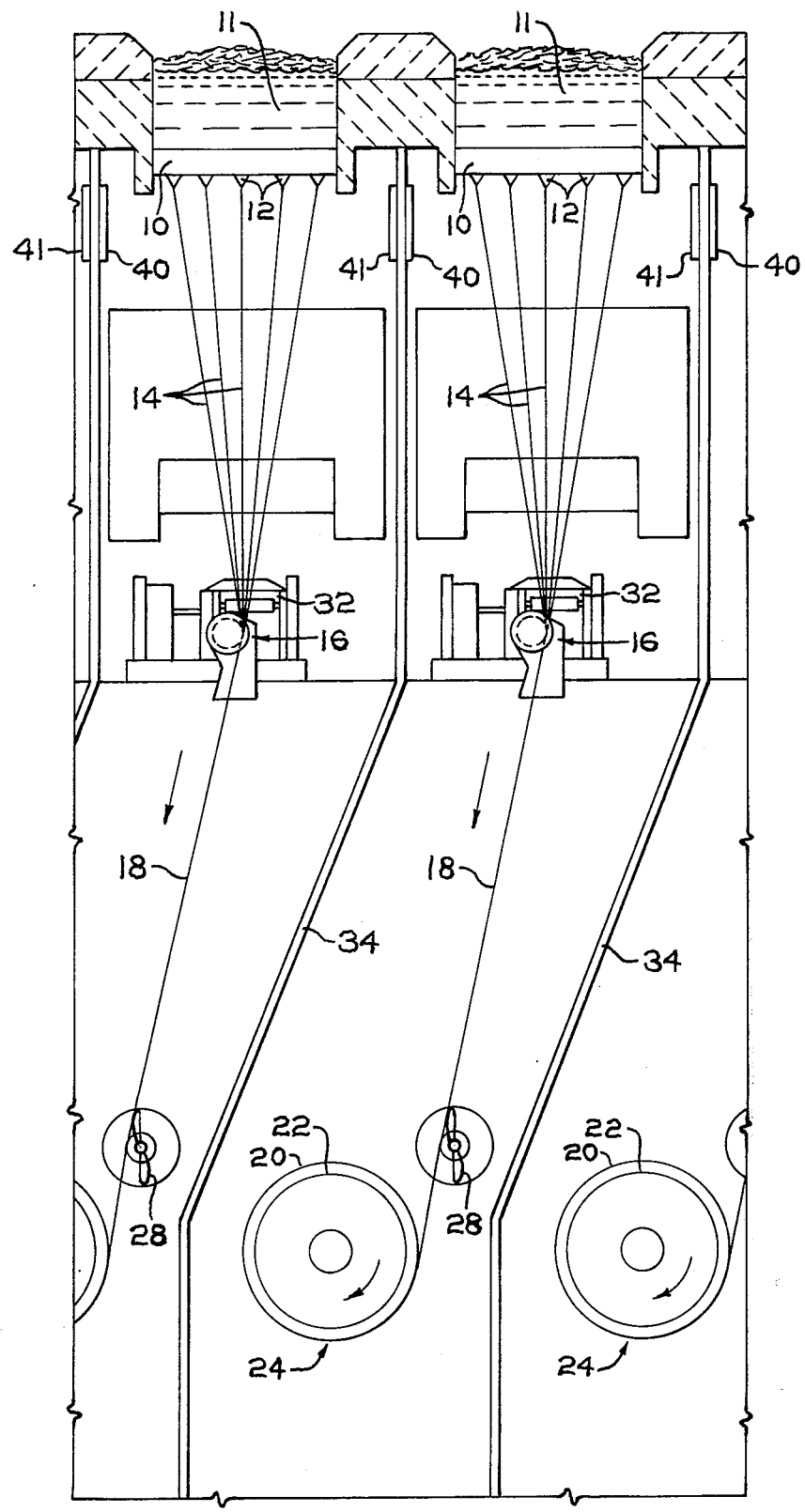
FIG. 1 is a diagrammatic representation of a glass fiber forming operation employing the method and apparatus of the present invention.

Turning now to FIG. 1, glass filaments 14 are attenuated through bushing tips 12 at the bottom of a heated bushing 10 containing molten glass 11. On either side of the bushing 10 and extending below the bushing 10 are one of a pair of generally flat cooling panels or manifolds 40 and 41. These panels will be more fully described below. The filaments 14 are passed across an applicator 32 where they are coated with a binder and/or size. This applicator may be, for example, a roller applicator, a belt applicator, a spray applicator, or the like.

The filaments are then passed in a groove of a gathering shoe 16, which is typically a grooved cylinder or wheel formed of a material such as graphite. The filaments 14 are gathered into a unified strand 18 within the groove of the gathering shoe 16. The strand 18 is traversed across the face of a rotating spiral 28 and is wound as a forming package 20 on a collet 22 carried by a winder 24. Instead of winding the strand 18 on the collet 22, as shown, the strand 18 could be chopped into individual particulate strands or used in numerous other like applications.

FIG. 2 illustrates one of the cooling panels or manifolds 40. The panel 41 is substantially indentical to the panel 40 except for the locations of the inlets and outlets along its length.

The manifold 40 has a plurality of inlet sections 42 and 43 and a plurality of return sections 44. The inlet sections 42 are connected at their intake by connectors 46 to the supply 78 of cooling fluid for the manifold through line 47. This cooling fluid may be water, DOWTHERM®, and other like cooling fluids. Chilled recirculating water is the preferred cooling fluid. Along the length of the inlet sections 42 are outlets 48. These outlets are connected by connectors 50 through line 59 to inlets 74 of the various elements within the bushing area apparatus which require cooling by the cooling fluid. Thee elements include a cooling ring embedded in the refractory material surrounding the platinum or platinum-rhodium bushing, the terminal clamps electrically connecting the bushing to its electrical power supply, cooling panels located in front of and behind the bushing, and the fin coolers. Some spare outlets 48 may additionally be located along the inlet sections 42 which may be sealed when not utilized.

The inlet section 43 is connected at 52 to a source of high pressure water, preferably from 70 to 200 pounds per square inch (476,190 to 1,360,544 pascals), to be supplied through outlets 54 to such locations as the prepad sprays and the forming level wash-down hoses. Panel 41 may or may not include this inlet section, depending upon the needs of a given forming position. Preferably, both panels 40 and 41 include this section.

The cooling fluid passing through the outlets 48 is directed to the elements previously mentioned. After passing through these elements, the cooling fluid leaves the elements through outlets 75, passes through line 51 and re-enters the manifold 40 through its outlet sections 44 by entering through the inlet connectors 58. The sections 44 are supplied with inlets 56 having connectors 58. As with the inlet sections 42, spare inlets 56 may be provided where desired which are sealed when not employed. The outlet sections 44 have outlets 60 through which the cooling fluid exits the manifold 40 through line 82 to be returned to the supply of cooling fluid, such as a recirculating water system. Manifold 41 acts identically to manifold 40.

While not absolutely necessary, it is desirable that each return manifold section 44 have a single inlet 56 connected at one time. This is desirable so that the operator can easily detect a clogged line by noting the lack of output from a given outlet 60, as will be described below. It is also highly desirable that similar inlets 48 and 56 are attached to similar cooling elements at each forming position. This adds to the ease of serviceability of the system for the operator.

It is further desirable to equalize the amount of cooling provided by each manifold 40 and 41 for a given forming position by careful selection of the elements connected to each outlet 48 and inlet 56. This helps provide a more uniform cooling amount for each manifold in its operation as a cooling manifold for the sides of the bushing to provide a more uniform temperature environment below the bushing.

As can be seen in FIG. 3, the inlet sections 42 and 43 are preferably larger in cross section and thus in volume than the return or output sections 44. This is preferable since the inlet sections 42 are normally connected to more than one element while the outlet sections 44 are normally connected only to a single element each.

The manifolds 40 and 41 are formed of a material which can withstand the hot and damp environment below the bushing. A suitable material is stainless steel. In physical appearance the manifolds are generally flat on their outer surface and that surface is parallel to the position divider on which it is mounted.

Thus, as cooling fluid flows through the manifolds 40 and 41 on its way to and from the various elements of the bushing apparatus, the manifold 40 acts as a cooling manifold for the sides or partitions between the bushings and for the environment around the bushing. At the same time, the fluid flowing through the elements of the bushing apparatus between the outlets 48 and the inelts 56 provide cooling to these elements. In addition, the amount of hose necessary to connect the elements to their necessary fluid supply is reduced thus resulting in a more open area below the bushing thus allowing increased air flow and aiding in providing a more uniform environment below the bushing.

Figure 4:
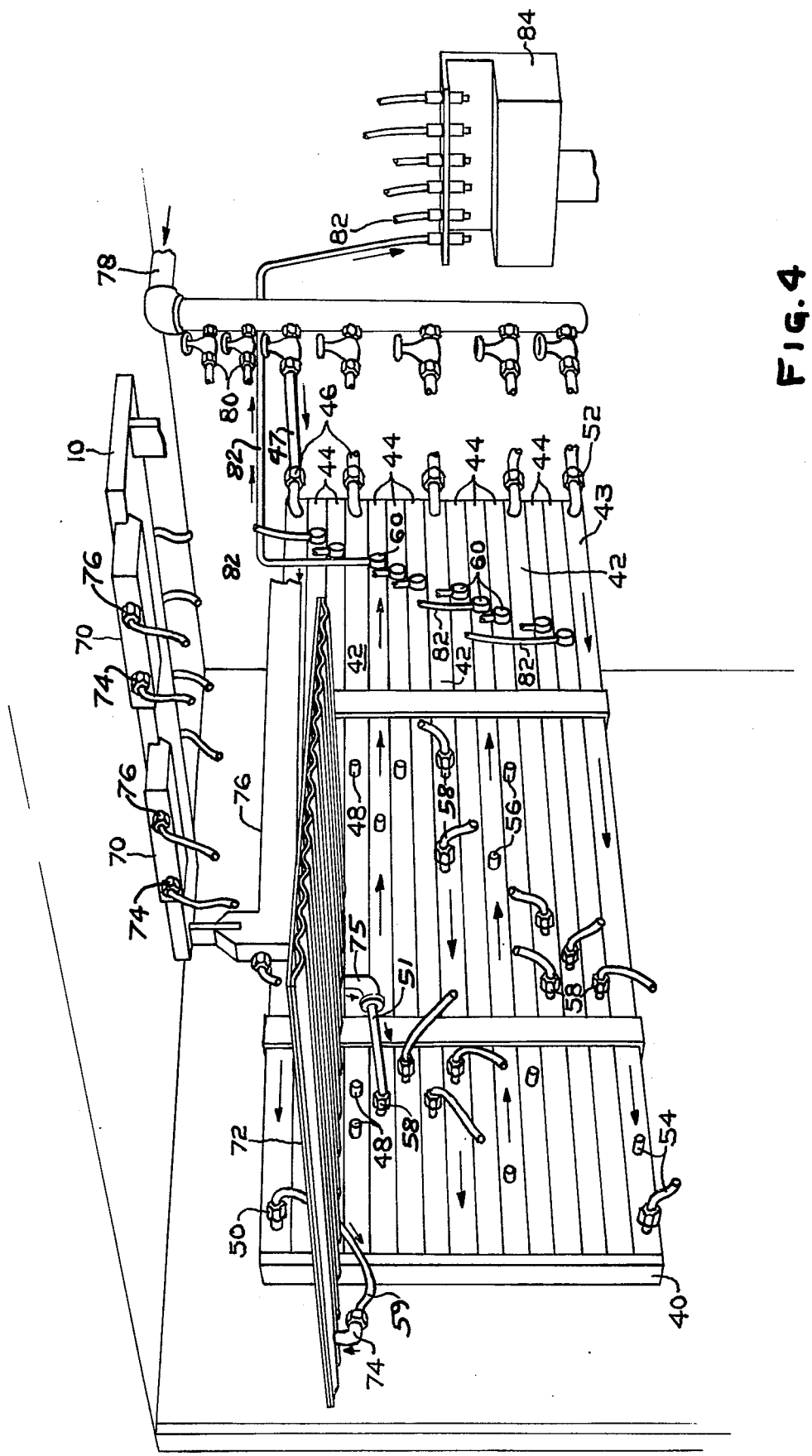
FIG. 4 is a perspective view of the relation between the cooling manifolds, bushing, intake manifold and recirculation system.

In FIG. 4, the panel 40 is illustrated in perspective. Above the panel 40 is a bushing 10, with its fin coolers 70 and its electrical terminal clamp 76. A front bushing cooling panel 72 is illustrated connected to an inlet section 42 of a panel 40 through line 74. This is typical of the connections to both inlets and outlets.

Manifold 78 is located behind the cooling panel 40. Its valves 80 are connected to the inlet section connections 46 and supply the cooling fluid for the system. A similar manifold supplies panel 41.

Lines 82 are the exit lines from the output sections 44. They are connected to outlets 60. By observing the fluid flow from the lines 82 into trough 84 and operator can immediately note a clog in the system. Preferably, each forming position will have all of its lines arranged identically or as near so as possible so that the operator can immediately note the location of a clog.

The trough 84 is connected to a cooling fluid recirculation system (not shown) to recycle the cooling fluid to intake manifold 78.

EXAMPLE

DE-150 bushings having 400 orifices each were operated at a rate of approximately 14,000 feet per minute (4263 meters per minute) for a time period of 35 days, using the cooling panels of the present invention. These bushings are rated to produce 36.9 pounds per hour (16.7 kilograms per hour) of wet pull of glass.

During the time period the bushings averaged 37.0 pounds per hour (16.8 kilograms per hour) for a job efficiency of 100.2 percent of expected output.

The calldown rate, the percent of packages formed to completion without a filament breakout was 63.8 percent.

For comparison, identical DE-150 bushings were operated during the same time span without the cooling panels of the present invention. These bushings averaged 30.7 pounds per hour (13.9 kilograms per hour) of wet glass pull, for a job efficiency of 83.1 percent. The percentage of calldowns was 33.9 percent.

Thus, it is obvious that the present invention provides an improved system for forming high quality glass filaments at both an improved production rate and with fewer filament breakouts than could previously be obtained.

While the present invention has been described with reference to a specific embodiment thereof, it is not intended to be so limited thereby, except as set forth in the accompanying claims.

We claim:

1. In a method of forming glass fibers comprising attenuating filaments through bushing tips in a bushing containing molten glass, the improvement comprising cooling both the environment surrounding and below the bushing and elements disposed in the fiber forming region adjacent the bushing by passing a cooling fluid through a pair of cooling manifolds, said manifolds being located on side partitions separating adjacent bushings, said manifolds being below the bushing on said partitions, said manifolds having inlet sections and outlet sections for flowing fluid in opposite directions, connecting said manifolds to said elements in fluid transfer relation, passing said fluid from the manifolds through said elements in a first direction to thereby cool said elements, returning said fluid from said elements to said manifolds, and flowing said fluid through said manifolds in the opposite direction to thereby cool said environment.

2. The method of claim 1 wherein said cooling fluid is water.

3. The method of claim 1 wherein approximately equal cooling is accomplished by each manifold.

4. In an apparatus for forming glass fibers comprising a bushing having a plurality of bushing tips through which filaments are attenuated from molten glass contained in the bushing, means for applying a binder and/or size to the filaments, a gathering shoe for combining the filaments into a unified strand and means for collecting the strand the improvement comprising a pair of cooling manifolds, one of which being located on either side of and below said bushing on side partitions positioned to separate adjacent bushings, said manifolds including inlet sections and outlet sections, said inlet sections being connected to a supply of cooling fluid at one end of flow said fluid in a first direction through said manifolds and to elements disposed in the fiber forming region adjacent said bushing to be supplied with said cooling fluid along their lengths, said outlet sections being connected along their lengths to said elements to flow said fluid in the opposite direction through said manifolds and being connected at one end to a return for said cooling fluid, said manifolds being designed and arranged to cool the environment surrounding and below the bushing while providing cooling fluid to the elements disposed in the fiber forming region adjacent the bushing.

5. The apparatus of claim 4 wherein said inlet sections are larger than said outlet sections.

6. The apparatus of claim 5 wherein said outlet sections are connected to a single element and said inlet sections are connected to more than one element.

7. The apparatus of claim 4 wherein said manifold is formed of stainless steel.

8. The apparatus of claim 4 wherein siad inlet sections and said outlet sections of each manifold are selectively connected to said elements to provide approximately equal cooling by each manifold 9. The apparatus of claim 4 further comprising an additional inlet section on at least one of manifolds connected to a high pressure cooling fluid supply.

10. An apparatus for forming glass fiber strands comprising a bushing having a plurality of bushing tips through which filaments are attenuated from molten glass contained in the bushing, an applicator having a surface across which said filaments pass, a gathering shoe for combining the filaments into a unified strand, a collet for winding the strand into a forming package and a pair of cooling manifolds, one of which being located on either side of and below the bushing on partitions separating adjacent bushings, said manifolds comprising inlet sections and outlet sections, said inlet sections being connected to a plurality of elements disposed in the fiber forming region adjacent said bushing in fluid flow relation to allow a cooling fluid to flow through said manifold in a first direction and to said elements, said outlet sections being connected in fluid flow relation to a single element to allow cooling fluid to flow from said element to its cooling section and through said manifolds in the opposite direction, said inlet sections being connected to a supply of cooling fluid and said outlet sections being connected to a return for said cooling fluid to provide cooling to the environment surrounding and below the bushing and to the elements disposed in the fiber forming region adjacent the bushing.

* * * * *

UNITED STATES PATENT AND TRADEMARK OFFICE
CERTIFICATE OF CORRECTION

PATENT NO. : 4,049,412

DATED : September 20, 1977

INVENTOR(S) : Joseph B. Dent, Jr.; Walter L. Martin, Jr. and Howard M. Bennett

It is certified that error appears in the above-identified patent and that said Letters Patent are hereby corrected as shown below:

Column 1, line 53, "high" should be --higher--.

Column 3, line 37, "The panel" should be --The cooling panel--.

Column 3, line 51, "Thee" should be "These--.

Column 4, line 22, "amound" should be --amount--.

Column 4, line 48, "inelts" should be --inlets--.

Column 4, line 49, "provide" should be --provides--.

Column 6, line 10, "of" should be --to--.

Column 6, line 29, "siad" should be "said".

Column 6, line 50, "manifold" should be --manifolds--.

Signed and Sealed this

Thirty-first Day of January 1978

[SEAL]

Attest:

RUTH C. MASON
*Attesting Officer*

LUTRELLE F. PARKER
*Acting Commissioner of Patents and Trademarks*